United States Patent [19]
Buhler et al.

[11] Patent Number: 5,682,071
[45] Date of Patent: Oct. 28, 1997

[54] MAGNETIC BEARING WITH CONSTANT-CURRENT SOURCE

[75] Inventors: Philip Buhler, Zürich; Roland Siegwart, Schwyz; Alfons Traxler, Winterthur, all of Switzerland

[73] Assignee: Mecos Traxler AG, Winterthur, Switzerland

[21] Appl. No.: 450,989

[22] Filed: May 25, 1995

[30] Foreign Application Priority Data

May 25, 1994 [CH] Switzerland ............... 1615/94

[51] Int. Cl.$^6$ ............................................. H02N 7/09
[52] U.S. Cl. ............................................. 310/90.5
[58] Field of Search ...................... 310/90.5, 68 R, 310/68 B; 318/293

[56] References Cited

U.S. PATENT DOCUMENTS

| | | | |
|---|---|---|---|
| 3,937,533 | 2/1976 | Veillette | 310/90.5 |
| 4,417,772 | 11/1983 | Robinson | 310/90.5 |
| 4,481,452 | 11/1984 | Kitano et al. | 318/681 |
| 4,723,735 | 2/1988 | Eisenhaure et al. | 244/165 |
| 5,066,879 | 11/1991 | Yamamura | 310/90.5 |
| 5,243,491 | 9/1993 | Van Eijk et al. | 361/144 |
| 5,262,692 | 11/1993 | Williams et al. | 310/90.5 |
| 5,277,948 | 1/1994 | Boon et al. | 361/144 |
| 5,319,273 | 6/1994 | Hockney et al. | 310/90.5 |

FOREIGN PATENT DOCUMENTS

| | | | |
|---|---|---|---|
| 0395116 | 10/1990 | European Pat. Off. | H02K 7/09 |
| 57-65414 | 4/1982 | Japan | H02K 7/09 |
| 165013 | 7/1986 | Japan | H02N 7/09 |

*Primary Examiner*—Steven L. Stephan
*Assistant Examiner*—Michael Wallace, Jr.
*Attorney, Agent, or Firm*—Browdy and Neimark

[57] ABSTRACT

A magnetic bearing supports an object such as a rotor in a stable, contactless position. The bearing has electromagnets, each associated with a respective current control means (e.g., amplifier or power switch), disposed to exert magnetic forces in various directions to levitate the rotor. A constant-current source feeds a constant (total) current the electromagnets in parallel. Sensing means detect movements of the rotor from the position and inform a controller that responds by controlling the respective current to each electromagnet to maintain the rotor in position.

19 Claims, 8 Drawing Sheets

MAGNETIC BEARING WITH CONSTANT-CURRENT SOURCE

FIELD OF THE INVENTION

The present invention relates to a method of operating an electromagnetic device for supporting objects without contact and to devices operating in accordance with such a method.

BACKGROUND OF THE INVENTION

In the method of electromagnetically supporting machine parts, the position of the object to be supported is measured by means of contactless position sensors. The measured signals are supplied to a controller which controls the currents or the voltages in electromagnets with the aid of power amplifiers in such a manner that the object to be supported levitates in a stable attitude. This method is most frequently used for supporting rotors without contact and for magnetic levitated transport systems.

The state of the art of such methods is known for example from the book Schweitzer, Traxler, Bleuler: "Magnetlager", Springer-Verlag, Berlin, Heidelberg, 1993.

SUMMARY OF THE INVENTION

The technique of active magnetic bearing is well known and is used in many industrial applications, but magnetic bearings are very expensive compared to conventional bearings. Accordingly, the present invention has an object, among others, to provide a less costly magnetic bearing having fewer components.

In any magnetic bearing, electromagnets are deployed in positions where they can control the object's position; usually the object will be a rotor having five degrees of freedom, and the magnets must control the position accordingly.

The present invention provides a magnetic bearing with electromagnets fed in parallel from a constant-current source. Each electromagnet has its own individual current control means (e.g., a power transistor or switch), and all the current control means are controlled by a controller. The controller may be analog, digital, or a combination of analog and digital devices; it may include a microprocessor that can adjust all the currents to the various electromagnets simultaneously, and it may include coordinate transform calculations so that the directions of magnetic force exerted by the various electromagnets need not be orthogonal or aligned with the directions of object motion detected by the position sensors.

To prevent current surging or induction effects, freewheeling diodes may be provided to shunt quickly-switched currents back to the constant-current source when the current control means abruptly changes its current throughput.

BRIEF DESCRIPTION OF THE DRAWING

The above and other objects and the nature and advantages of the present invention will become more apparent from the following detailed description of an embodiment[s] taken in conjunction with drawings, wherein:

FIG. 9B is a schematic, longitudinal cross-sectional view of the embodiment of FIG. 9a.

DETAILED DESCRIPTION OF THE PREFERRED EMBODIMENT

Figure 1:
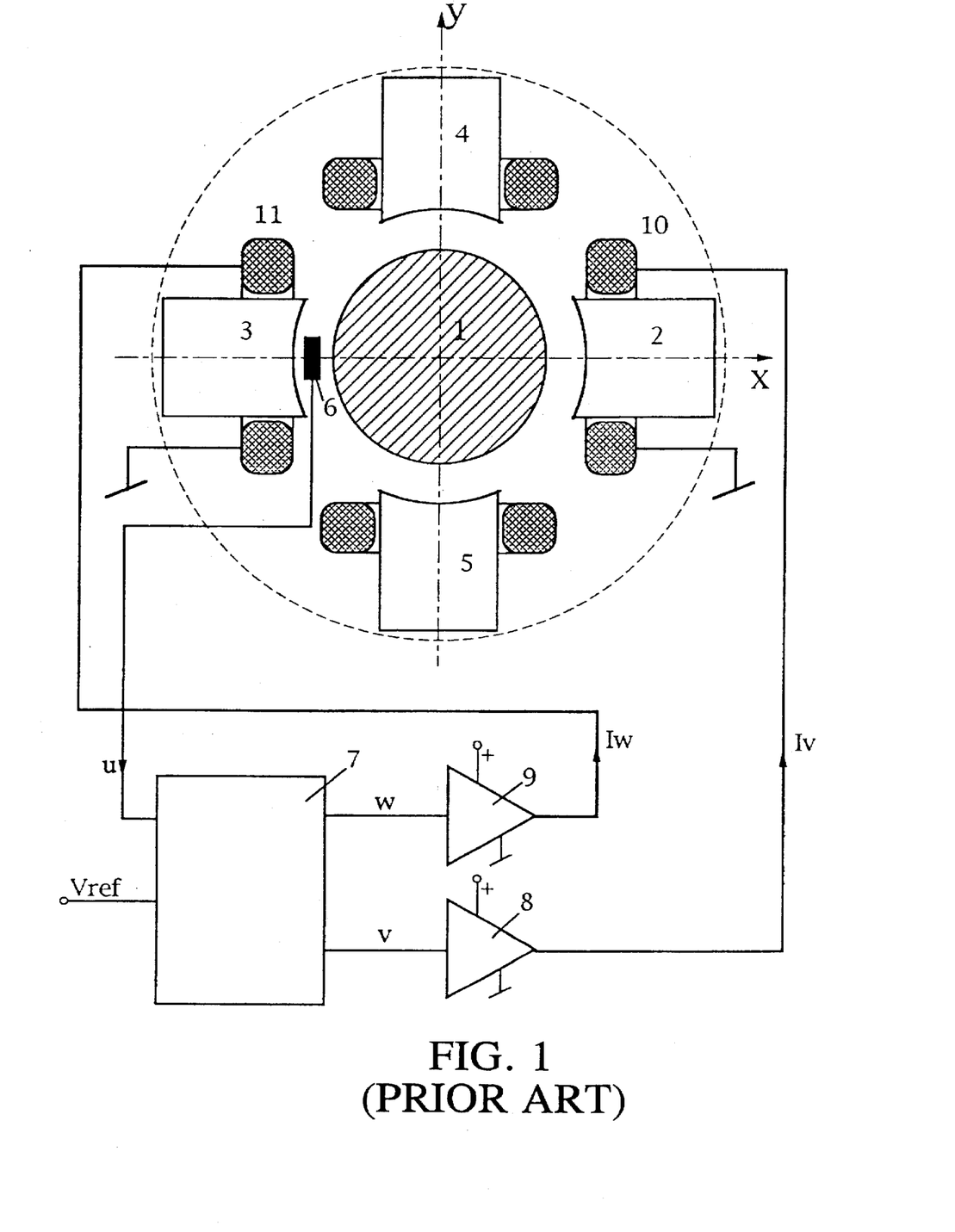
FIG. 1, labeled "prior art", is a schematic view showing a magnetic bearing according to today's state of the art.

FIG. 1 shows a cross section of a rotor 1 at one end, where two electromagnets 2, 3 are acting in the x-axis and two electromagnets 4, 5 are acting in the y-axis. The control loop of the x-axis is as follows: A position sensor 6 measures the displacement of the rotor in the x-direction. The output signal u of the position sensor 6 measures the displacement of the rotor in the x-direction. The output signal u of the position sensor 6 is fed to a controller 7. The controller compares this signal u with the reference signal Vref. This reference signal Vref usually corresponds to the centric position of the rotor 1 in the middle between the electromagnets 2 to 5. The output signals v, w of the controller 7 are connected to power amplifiers 8, 9 which drive the currents Iv, Iw for the coils 10, 11 of the electromagnets 2,3.

The signals u, v, w are typical low power signals. The power amplifiers 8,9 are used to drive the coils 2, 3 with currents and voltages of high power according to their input signals v and w. The power amplifiers 8 and 9 are fed by a powerful DC-voltage supply.

There are various well-known methods to stabilize the rotor 1 in FIG. 1 in its x-axis, using dynamic control. To stabilize the rotor 1 in the y-plane of FIG. 1 a similar control loop is necessary. Since a rotor is a three dimensional object the rotor 1 has to be stabilized in a second plane arranged typically at the other end of the rotor. Therefore usually four pairs of magnets are used for this purpose. To achieve a fully contactless operation of the rotor 1 another pair of magnets is used to stabilize it in the axial direction, the z-axis. All together, five pairs of magnets are used to stabilize the rotor 1 in five degrees of freedom. This corresponds to the five degrees of freedom of a rotating rigid body, since the sixth degree of freedom of such rigid body is the rotation along its rotation axis.

Figure 2:
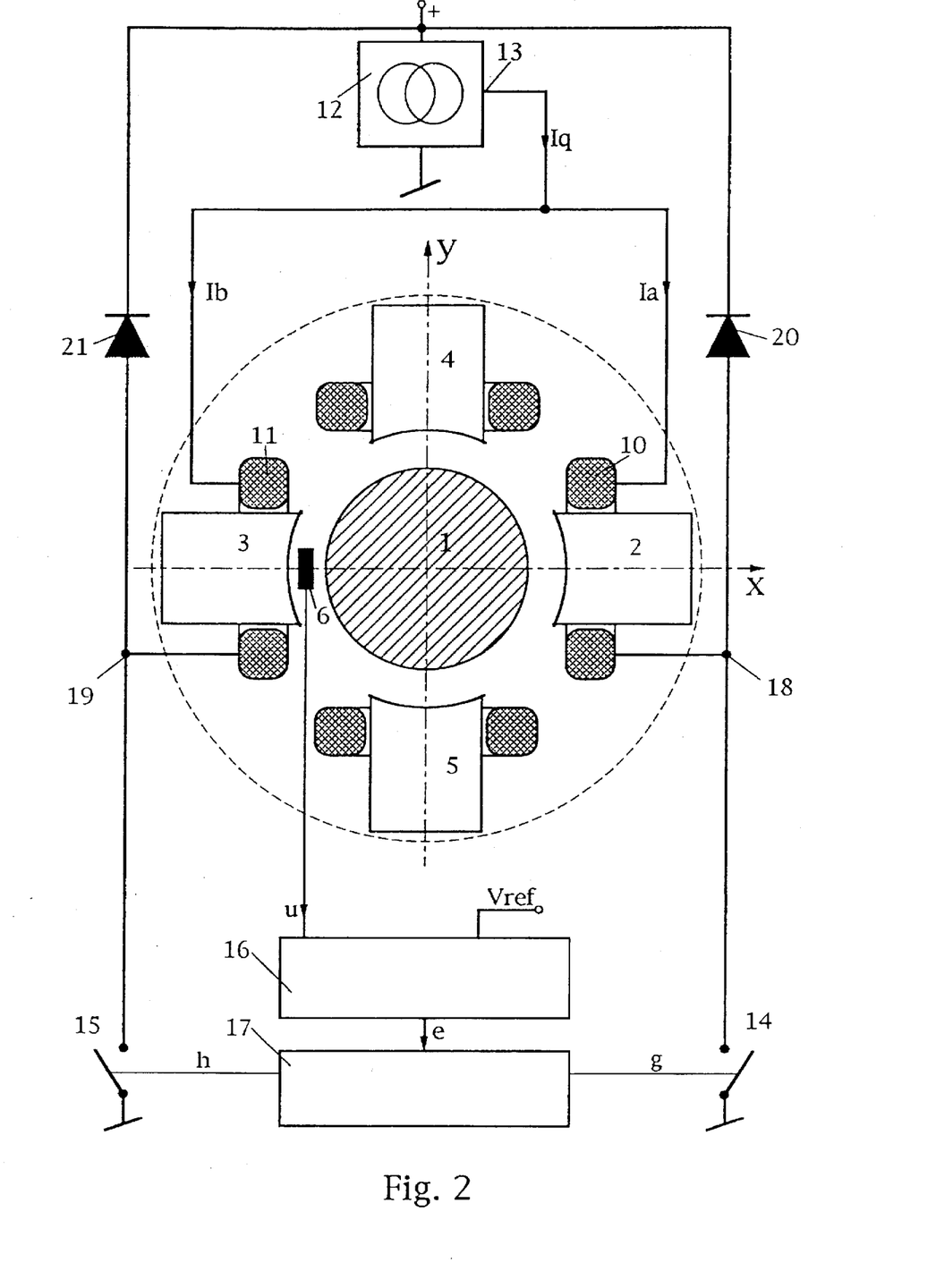
FIG. 2 is a schematic view showing a first magnetic bearing according to the invention.
Figure 3:
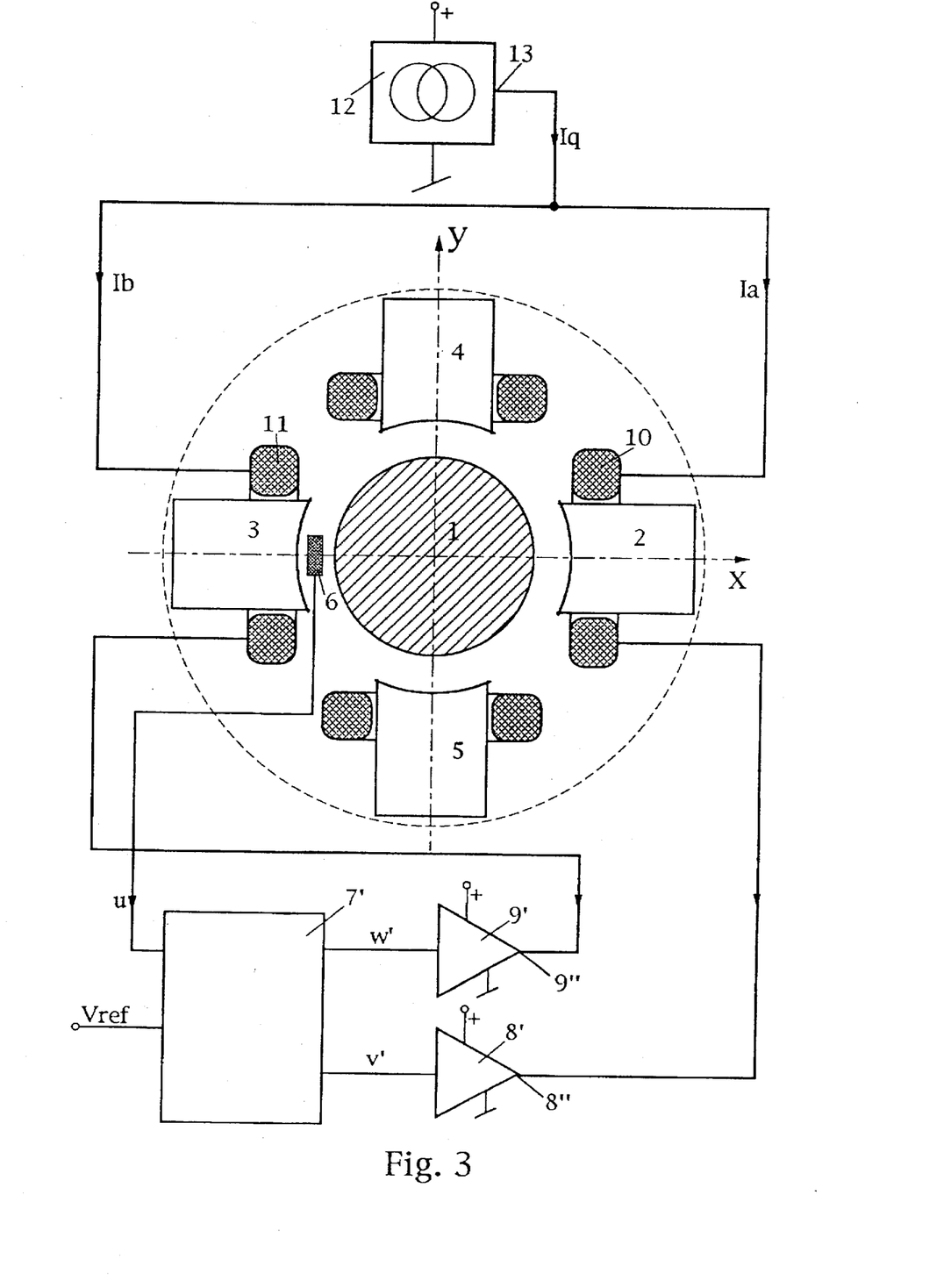
FIG. 3 is a schematic view showing a second magnetic bearing according to the invention.

The embodiments in FIG. 2 and 3 can work with the same electromagnets and coils as the one in FIG. 1. To show this, the electromagnets 2 to 5 and the coils 10 and 11 are marked with the same reference numerals in FIGS. 1, 2 and 3.

In opposition to known systems, the design shown in FIG. 2 contains a current source 12 keeping a constant current Iq at its output 13. One part Ia of this current Iq goes through coil 10 and then either through switch 14 to the negative supply if the switch is closed, or through freewheeling diode 20 back to the positive supply if the switch is open. The other part Ib of the current Iq goes through coil 11 and through either switch 15 to the negative supply or through diode 21 back to the positive supply, depending on switch 15. The negative supply is typically equal to ground. The switches 14 and 15 are typically solid state switches, e.g. transistors.

The sensor signal u is fed to a controller 16. This controller generates a signal e for a modulator 17. The output signals g and h of this modulators open and close the switches 14 and 15 in such a manner that the rotor is floating in the x-axis at the desired position. The freewheeling diodes 20 and 21 are necessary to enable a continuous current flow through the coils 10 and 11 therefore to protect the switches 14 and 15 from destruction by induced high voltages of these coils. The modulator 17 may be a pulse width-modulator.

The control electronics may consist of a sensor 6, a current source 12, a controller 16, a modulator 17, two switches 14, 15 and two diodes 20, 21 for each axis. This means these compartments are necessary five times for five axes.

The design of FIG. 3 contains a current source 12 also. Its output is connected to coil 10 which is connected to the output 8" of the amplifier 8' on one hand and on the other hand it is connected to coil 11 which is connected to the output 9" of the amplifier 9'. The current outputs at 8", 9" and 13 are Ia, Ib and Iq. Iq will always be the sum of Ia and Ib (Iq=Ia+Ib). The output u of sensor 6 is fed to a controller 7' which generates the signals v', w' for the amplifiers 8' and 9'. The voltage at the outputs 8" and 9" is controlled in such a manner, that the resulting output currents Ia and Ib keep the rotor floating at the desired position along the x-axis.

Figure 4:
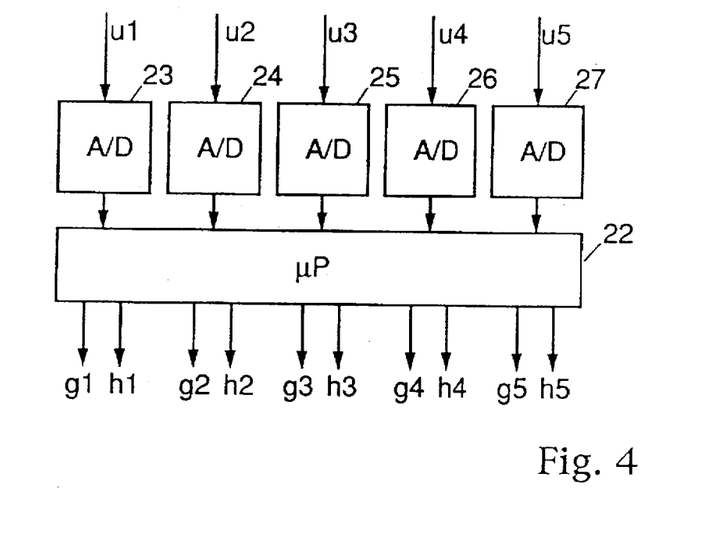
FIG. 4 is a schematic view showing a microprocessor working as a controller.

The control of a system according to FIG. 1 can be realized in analog or digital technique. In a design with five degrees of freedom the five controllers 7 can be realized with one single microprocessor 22 as shown in FIG. 4. This kind of controller needs five analog digital converters 23 to 27 to convert the analog sensor signals u1, u2, u3, u4, u5, u6 to digital signals. The five sensor signals are used for the five degrees of freedom which have to be controlled. The microprocessor 22 generates ten digital output signals, which can be converted back to analog signals using D/A-converters. These ten signals v1 to v5 and w1 to w5 are connected to ten amplifiers for the five pairs of magnets.

The controller 16 of FIG. 2 can be realized with the microprocessor 22 of FIG. 4. In this case the outputs of the microprocessor 22, g1, h1, g2, h2, g3, h3, g4, h4, g5, h5 (FIG. 4) can be connected directly to the switched 14, 15 and to eight more switches for the rest of the five pairs of coils. Depending on the type of switches, ten simple drivers must be added between the microprocessor 22 and the switches. The modulator 17 is no longer necessary and there is no need for D/A-converters any more. Compared with a conventional system this new configuration needs ten D/A-converters less if the microprocessor 22 is capable of generating, e.g., pulse width-modulated signals at the outputs g1, h1, g2, h2, g3, h3, g4, h4, g5, h5. Such a capability is conventional.

Figure 5:
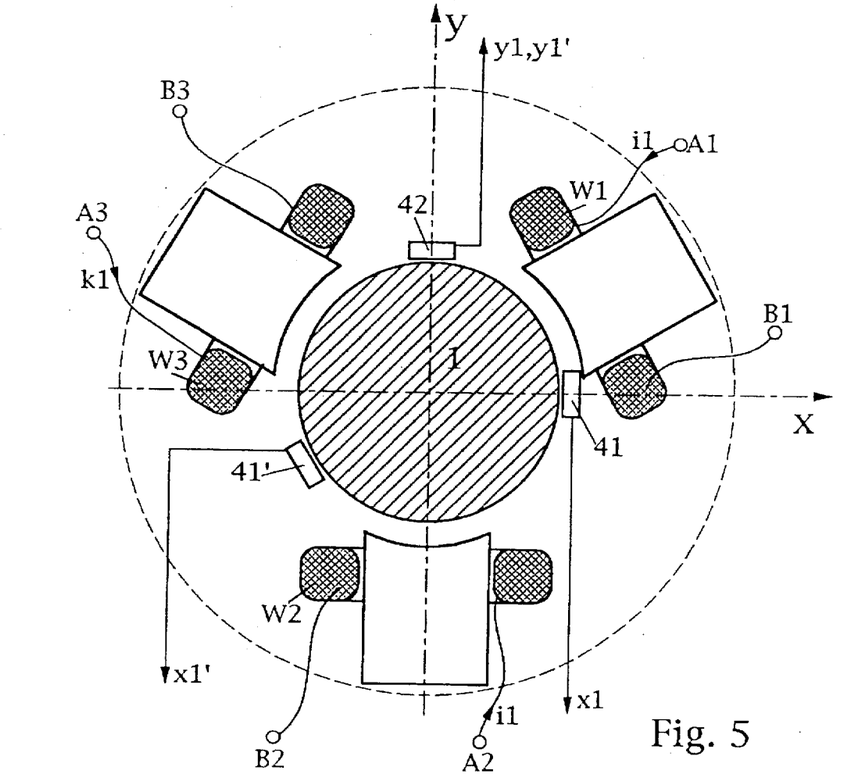
FIG. 5 is a schematic view showing a magnetic bearing with three electromagentics.

The design of FIG. 5 has three magnets with coils W1, W2, W3 arranged around the one end of the rotor. The ends of the coils W1, W2, W3 are named A1, A2, A3, and B1, B2, B3. There are two sensors 41, 42 or 41', 42 to measure the position of the rotor in x- and y-axes. The three electromagnets in FIG. 5 are arranged around the rotor in angles of 120°. They can replace the four electromagnets of FIG. 2 by using the circuit of FIG. 6. The trio of electromagnets of FIG. 5 together exert force generally within a plane rather than along a single force axis, as do the opposing pairs of electromagnets of FIG. 2. This distinction is evident in the drawing.

Figure 6:
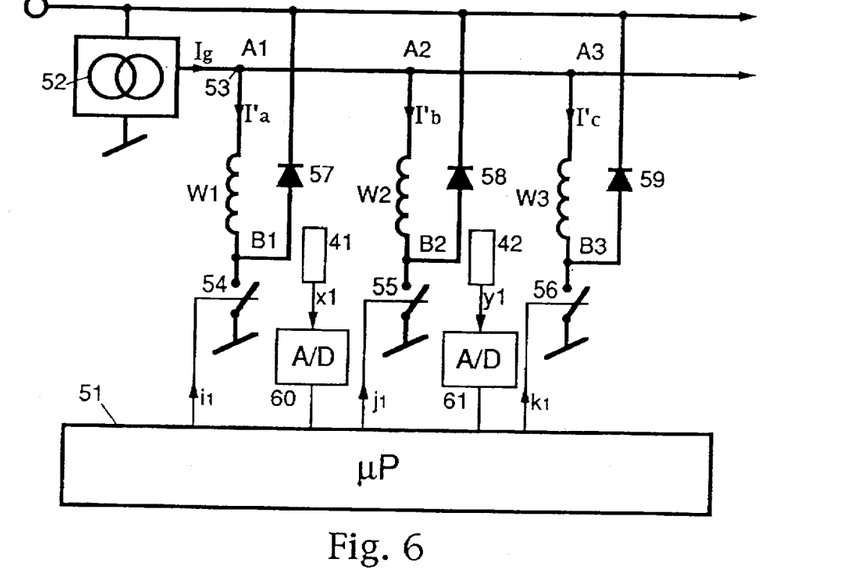
FIG. 6 is a schematic showing a controller for an magnetic bearing according to FIG. 5.

The output 53 of the current source 52 in FIG. 6 is connected to the wires A1, A2, A3 of the coils W1, W2 and W3. The other ends of the coils B1, B2 and B3 are connected each to a switch 54, 55, 56 and to a diode 57, 58 and 59. The switches are connected to the negative supply (or to ground) and the diodes are connected to the positive supply.

Figure 7:
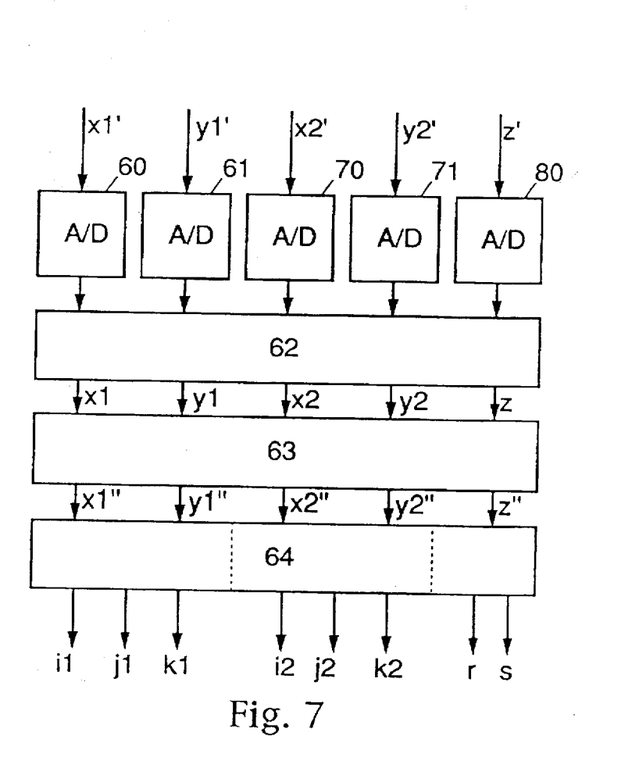
FIG. 7 is a schematic view showing a microprocessor working as a controller for the magnetic bearing according to FIG. 5 and 6.

Sensors 41' and 42 generate the signals x1' and y1'. These signals are converted to digital values 60, 61 and then put to the microprocessor. The microprocessor can perform a coordinate transformation as shown in FIG. 7. In this design, the microprocessor contains a transformation algorithm 62 for the sensor signals, a controller 63 and a transformation algorithm 64 for the output signals. Such transformation algorithms are conventional and are available in the form of equations. In FIG. 5 the two sensors 41' and 42 are placed in the non-orthogonal position. The transformation algorithm 62 converts the non-orthogonal sensor signals x1', y1', y2', z' to the orthogonal signals x1, y1, x2, y2, z. If the sensor 41 is used instead of sensor 41', the transformation 62 is not necessary. The controller 63 computes the output signals x1", y1" x2", y2", z which are converted by the second transformation algorithm to the signals i1, j1, k1, i2, j2, k2, r and s. The first three signals i1, j1, k1 are for a first arrangement according to FIG. 5 at one end of the rotor, the second three signals i2, j2, k2 are for a second arrangement at the other end of the rotor, and the remaining two signals r, s are for an additional pair of magnets for the axial stabilization of the rotor. This configuration enables the control of five degrees of freedom with eight instead of ten output signals.

Figure 8:
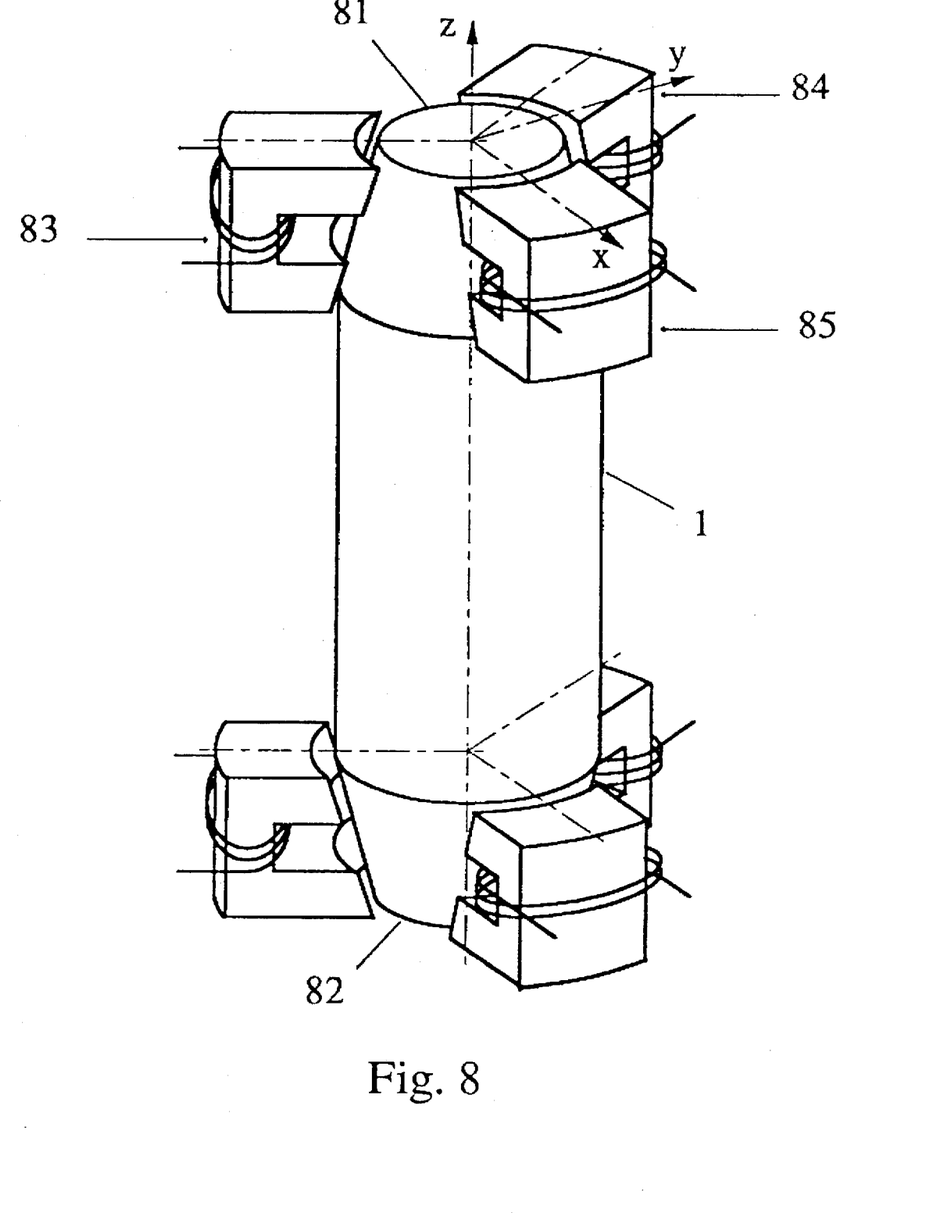
FIG. 8 is perspective view of one embodiment of the invention.

FIG. 8 shows a configuration with six magnets. The ends 81, 82 of the rotor 1 have a conical shape. The three electromagnets 83, 84 and 85 at one end are arranged in a way that they can apply forces to the rotor in three axes x, y, and z. Another set of three magnets is placed at the other end of the rotor in the same manner. In this configuration, the invention allows the control of all five degrees of freedom using only one single current source. This leads to a dramatic decrease in component count and system cost. Now a microprocessor 64 (FIG. 7) with only six output signals i1, j1, k1, i2, j2, k2 for the six electromagnets can be used. Axial stabilization is achieved without an additional pair of magnets using the three magnets on each end of the rotor.

Figure 9A:
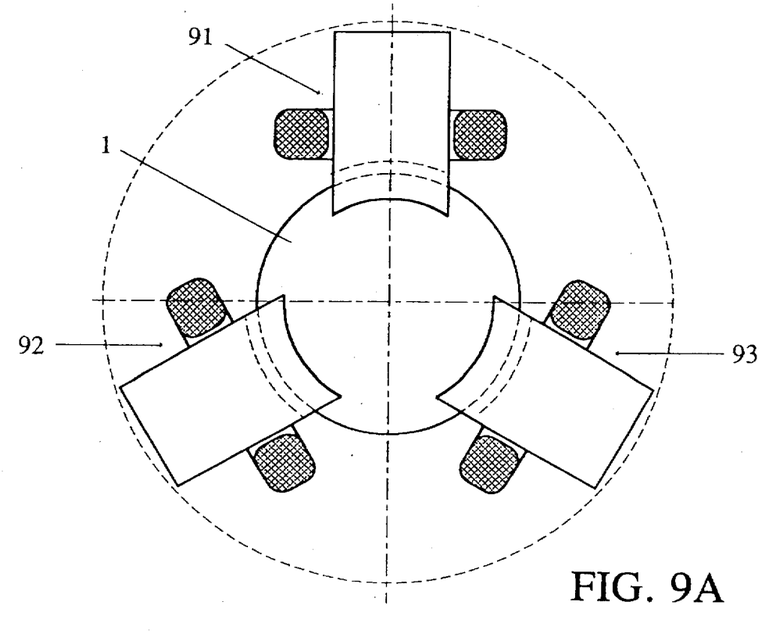
FIG. 9A is a schematic, transverse cross-sectional view of a further embodiment of the invention.
Figure 9B:
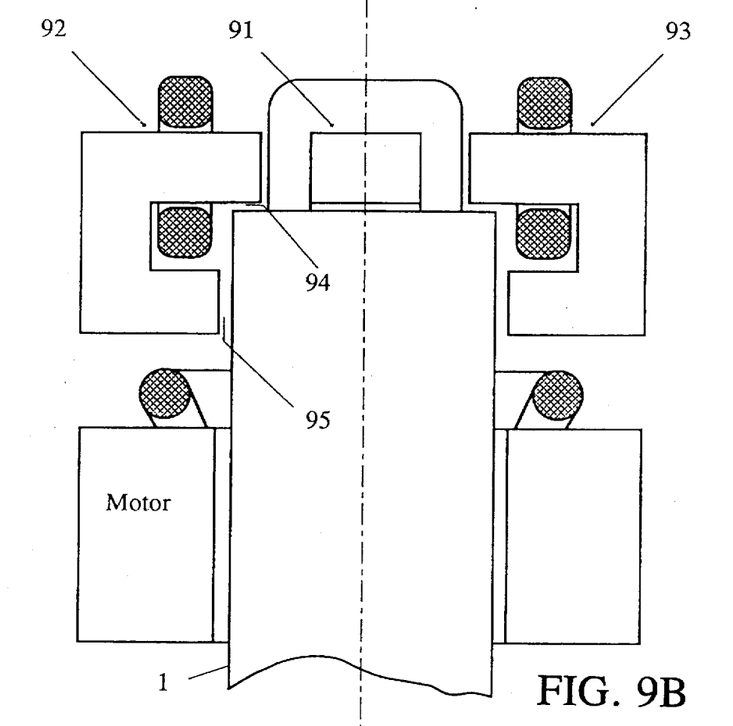
Figure 10:
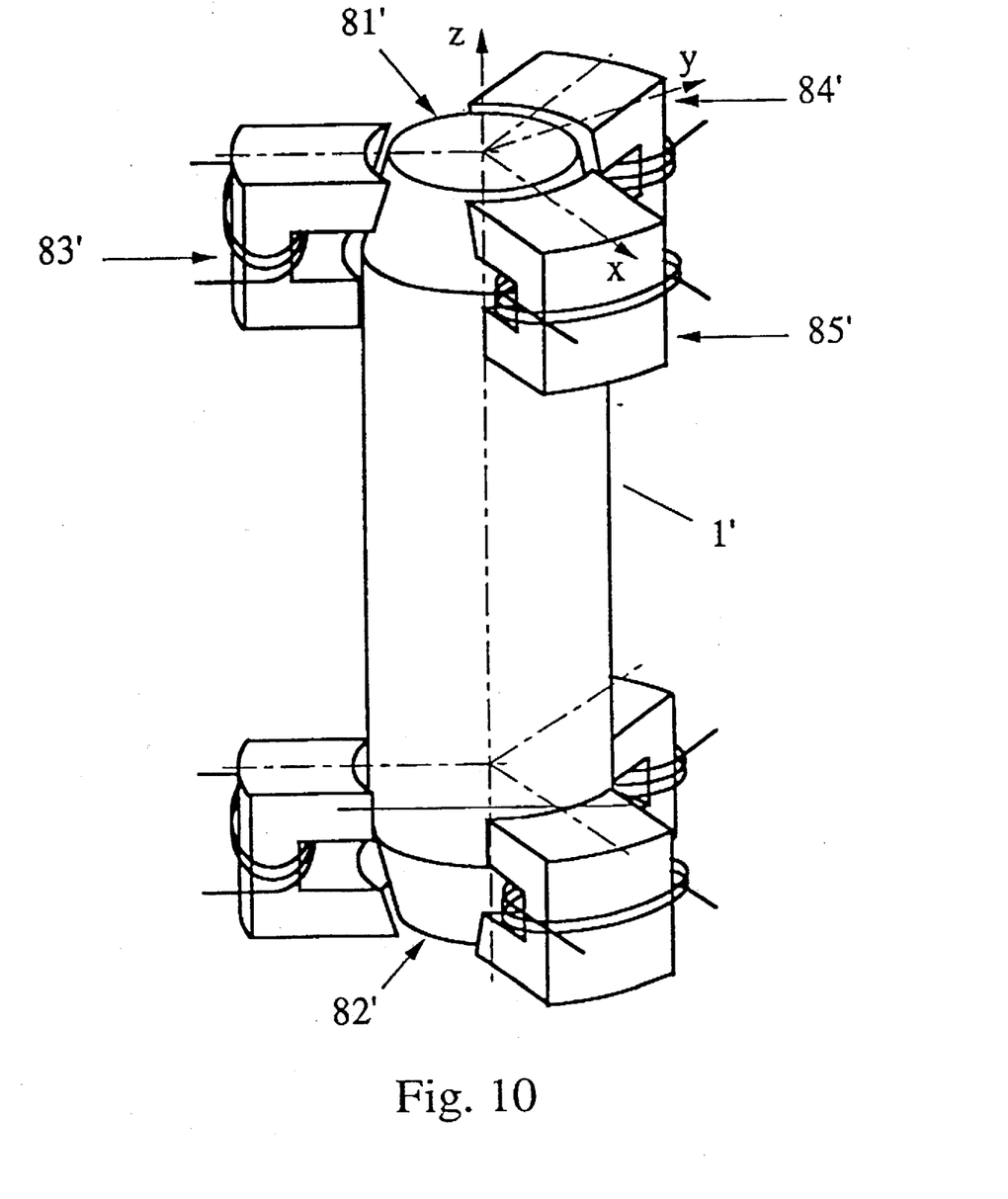
FIG. 10 is perspective view of another embodiment of the invention.

In FIG. 9 the electromagnets 91, 92, 93 are arranged at the end of a rotor in a way that one pole-shoe of each magnet is placed at the front side of the rotor with the airgap 94 to generate axial forces and the other pole shoe is placed at the circumference of the rotor with the airgap 95 to generate radial forces.

The measurement of the rotor position can be done by measuring the flux density in the airgaps. A magnetic bearing using Hall-Effect sensors was presented in the "2nd International Symposium on Magnetic Bearings, Jul. 12–14, 1990 Tokyo, Japan, pages 229 to 235" by D. Zlatnik and A. Traxler.

There are applications where the rotor is stabilized partly by passive magnetic bearings or by other bearing types, so that the magnetic bearing does not necessarily control all five degrees of freedom. Even in those cases, the invention can be used to stabilize the desired number of degrees of freedom. It was found that the needed number of current sources is equal to the difference between the number of electromagnets and the number of degrees of freedom which have to be controlled. In a magnetic bearing with ten electromagnets and five degrees of freedom (FIG. 2), five current sources are needed (10−5=5). In the example of FIG. 8 with six electro magnets and five degrees of freedom only one current source is needed (6−5=1).

To achieve a high efficiency, switching current sources can be used. In that case the invention proposes to synchronize the current source(s) with the switches 14, 15, or with the switches 54, 55, 56 at equal frequencies. The switching current source(s) can also be synchronized with the switches in a frequency ratio of n:m, where m and n denote integer values. For applications with low power, passive current sources can be used to simplify the electronics.

Magnetic bearing of the state of the art (FIG. 1) use two amplifiers with current control and two magnets for each axis under control. Each of those amplifiers contains circuits for current measurement, current control, pulse width modulation and the power switches. If one wants to integrate the pulse width modulation in the microprocessor (as it was done in FIG. 2 or FIG. 6) in such a system, it would be necessary to close the current control loop through the microprocessor. The digital current control compares the actual value of the current in the coils with the desired values v, w (FIG. 1) and the microprocessor generates the necessary pulse width signal. This means that all current measurements of the coils would have to be read into the microprocessor. Ten more analog digital converters would be necessary, which is quite disadvantageous. Even if voltage control is used to avoid the current control loops (D. Vischer, Diss. Nr. 8665, ETH Zürich, 1988), the current measurements must still be fed to the microprocessor, using analog digital converters, to enable the control of the bias currents and the current limitation to protect amplifiers and coils from excessive currents.

The big advantage of the invention is, that with the constant current source, together with the implementation of the pulse width modulation in a microprocessor, a big part of the electronics can be deleted. The current source keeps the bias current constant and limits the maximum current of the coils at the same time. There is no current measurement necessary at all. The current source itself may need one current sensor, depending on the realization.

A further advantage is found in the driver circuit for the power switches in the amplifier. A conventional amplifier uses two switches for one channel. One switch is placed between the positive supply and one end of the coil, the other switch is placed between the other end of the coil and the negative supply. The driver circuit for the first switch is complicated since it needs a potential shifting circuit.

In a system built using the invention, all switches are placed at the negative supply potential (ground). Only the power switch inside the switching current source is at a different potential, which is no problem because this switch doesn't have to be controlled by the microprocessor.

In addition, a galvanic isolation between the microprocessor and the power circuit can be realized easily because there are only digital pulses in between, whereas in conventional systems analog signals are used to control the power amplifiers.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A magnetic bearing for supporting an object in a stable, contactless levitation position, comprising:
   two or more electromagnets, each one of the electromagnets being associated with a respective switching means and each said one generating a respective magnetic force on the object when a respective current is passed through the one electromagnet;
   a constant-current source having a DC-input connected to a constant voltage source, said constant current source feeding a constant total current to said two or more electromagnets in parallel;
   sensing means for detecting movement of the object from the position;
   a controller, responsive to the sensing means, for controlling each respective switching means to maintain the object at the position;
   the controller including means for controlling the switching means to permit the currents in each of said electromagnets connected in parallel to be constantly changing while the total current remains constant.

2. The bearing according to claim 1, comprising:
   a first number of current sources, the first number being one or more;
   a second number of electromagnets being the sum of the first number of current sources and a third number of degrees of freedom which are desired to be controlled.

3. The bearing according to claim 1, wherein
   each one of the electromagnets includes a respective first coil end and correspondingly respective second coil end;
   the constant current source feeds current in parallel to each first coil end; and
   the respective switching means associated with each said one of the electromagnets is coupled to the respective second coil end.

4. The bearing according to claim 3, including a freewheeling diode coupled intermediate each respective second coil end and said DC-input of the constant-current source, whereby diverted current may flow through the freewheeling diode when the current control means reduces a flow of current therethrough.

5. The bearing according to claim 3, wherein the controller implements pulse width modulation.

6. The bearing according to claim 3, wherein the constant current source and the switching means are synchronously switched.

7. The bearing according to claim 1, wherein the switching means include analog power amplifiers.

8. The bearings according to claim 3, wherein the object has a first shape and the faces of the electromagnet have a second shape such that airgaps between the first shape and the second shape comprise configuration means such that magnetic forces along three orthogonal axes are able to be generated.

9. The bearing according to claim 3, wherein the controller includes means for calculating a coordinate transform.

10. The bearing according to claim 1, wherein the switching means includes an amplifier.

11. The bearing according to claim 1, wherein the switching means includes a power switch.

12. The bearing according to claim 1 wherein the two or more electromagnets comprise a pair exerting force generally along a single force axis.

13. The bearing according to claim 1 wherein the two or more electromagnets comprise a trio exerting force generally in a single force plane.

14. A magnetic bearing for supporting an object in a stable, contactless levitation position, comprising:

a constant-current source (12) having an output (13), a first electromagnet comprising a coil (10) having a first end connected to said output (13) of said constant-current source (12) and a second end (18) connected to a first switching means (14; 8'), and wherein a resulting variable current Ia flows through said coil (10) of said first electromagnet, a second electromagnet comprising a coil (11) having a first end connected to said output (13) of said constant-current source (12) and a second end (19) connected to a second switching means (15; 9'), and wherein a current Ib flows through said coil (11) of said second electromagnet, said constant-current source (12) keeping a constant current Iq at its output (13) so that the sum $$Ia + Ib = Iq$$

is constant, a position sensor (6) measuring the displacement of the object with respect to one of the electromagnets, and a control means (16, 17; 7') having an input connected to said position sensor (6) and wherein said control means have a first output connected to said first switching means and a second output connected to said second switching means.

15. A magnetic bearing for supporting an object in a stable, contactless levitation position, comprising:

a constant-current source (52) keeping a constant current (Ig) at its output (53), a first electromagnet comprising a coil (W1) having a first end (A1) connected to said output (53) of said constant-current source (52) and a second end (B1) connected to a first switch (54), and wherein a current I'a flows through said coil (W1) of said first electromagnet, a second electromagnet comprising a coil (W2) having a first end (A2) connected to said output (53) of said constant-current source (52) and a second end (B2) connected to a second switch (55), and wherein a current I'b flows through said coil (W2) of said second electromagnet, a third electromagnet comprising a coil (W3) having a first end (A3) connected to said output (53) of said constant-current source (52) and a second end (B3) connected to a third switch (56), and wherein a current I'c flows through said coil (W3) of said third electromagnet, said constant-current source (52) keeping a constant current Ig at its output (53) so that the sum $$I'a + I'b + I'c = Ig$$

is constant, a first position sensor (41) measuring a first displacement of the object with respect to the first electromagnet, a second position sensor (42) measuring a second displacement of the object with respect to the second electromagnet, a microprocessor (51), a first analog/digital converter connected between said first position sensor (41) and a first input of said microprocessor (51), a second analog/digital converter connected between said first position sensor (42) and a second input of said microprocessor (51), wherein said microprocessor (51) supplies three control signals (i1, j1, k1) each for one of said three switches (54, 55, 56), a first diode (57) connected between said second end (B1) of said coil (W1) of said first electromagnet and a DC-input of said constant-current source (52), a second diode (58) connected between said second end (B2) of said coil (W2) of said second electromagnet and said DC-input of said constant-current source (52), and a third diode (59) connected between said third end (B3) of said coil (W3) of said third electromagnet and said DC-input of said constant-current source (52).

16. The magnetic bearing according to claim 15, wherein said object is a rotor (1) with at least one end (81, 82) having conical shape, and wherein said three electromagnets (83, 84, 85) are arranged forming partially a conical airgap at said conical region of the end of the rotor.

17. The magnetic bearing according to claim 15, wherein said object is a rotor (1) with at least one end having a front side, and wherein said three electromagnets are arranged at the end of the rotor (1) in a way that one pole shoe of each magnet (91, 92, 93) is placed forming an airgap (94) parallel to said front side of the rotor to generate axial forces and the other pole shoe is placed in the circumference of the rotor with a partially cylindrical air gap (95) to generate radial forces.

18. The magnetic bearing according to claim 14, wherein the control means implement pulse width modulation, and wherein the constant-current source and the first and the second switching means are synchronously switched.

19. The magnetic bearing according to claim 15, wherein the microprocessor implements pulse width modulation for the control of the switches, and wherein the constant-current source and the first, the second and the third switches are synchronously switched.

* * * * *